(12) United States Patent
Forrest

(10) Patent No.: US 6,484,924 B1
(45) Date of Patent: Nov. 26, 2002

(54) METHOD AND APPARATUS FOR BACKING UP A FRICTION STIR WELD JOINT

(75) Inventor: R. Scott Forrest, Santa Ana, CA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/929,319

(22) Filed: Aug. 14, 2001

(51) Int. Cl.[7] .............................................. B23K 20/12
(52) U.S. Cl. ...................... 228/112.1; 228/2.1; 228/103
(58) Field of Search .............................. 228/2.1, 112.1, 228/103

(56) References Cited

U.S. PATENT DOCUMENTS

| 3,940,048 A |   | 2/1976 | Casey |
|---|---|---|---|
| 4,103,142 A |   | 7/1978 | Cartwright |
| 4,840,304 A |   | 6/1989 | Sato et al. |
| 5,460,317 A |   | 10/1995 | Thomas et al. |
| 5,611,479 A |   | 3/1997 | Rosen |
| 5,624,067 A |   | 4/1997 | Harwig et al. |
| 5,769,306 A | * | 6/1998 | Colligan ................. 228/112.1 |
| 6,050,475 A | * | 4/2000 | Kinton et al. ............. 144/142 |
| 6,070,784 A | * | 6/2000 | Holt et al. ............... 228/112.1 |
| 6,237,835 B1 | * | 5/2001 | Litwinski et al. ......... 228/112.1 |
| 6,247,634 B1 | * | 6/2001 | Whitehouse ............. 228/112.1 |
| 6,257,479 B1 | * | 7/2001 | Litwinski et al. ......... 228/112.1 |

FOREIGN PATENT DOCUMENTS

| JP | 410052769 A | * | 2/1998 |
|---|---|---|---|
| JP | 02000202649 A | * | 7/2000 |
| JP | 2001219280 A | * | 8/2001 |
| SU | 749611 |   | 1/1977 |

OTHER PUBLICATIONS

US 2001/0015369A1 Litwinski et al. (Aug. 23, 2001).*
US 2001/0040179A1 Tochigi et al. (Nov. 15, 2001).*

* cited by examiner

*Primary Examiner*—M. Alexandra Elve
*Assistant Examiner*—Kiley Stoner
(74) *Attorney, Agent, or Firm*—Alston & Bird LLP

(57) ABSTRACT

The present invention provides a backing device for backing up weld joints formed by friction stir welding workpieces having curvilinear geometries. The backing device includes a backing ring defining a contact zone. At least a portion of the contact zone defined by the backing ring engages the weld joint opposite the friction stir welding tool to thereby support the weld joint and to constrain the plasticized material within the weld joint. The backing device includes a restraining member in operable communication with the backing ring to urge the contact zone of the backing ring toward the weld joint. The backing device includes a sensor for measuring the magnitude of force exerted by the contact zone of the backing ring upon the weld joint.

34 Claims, 16 Drawing Sheets

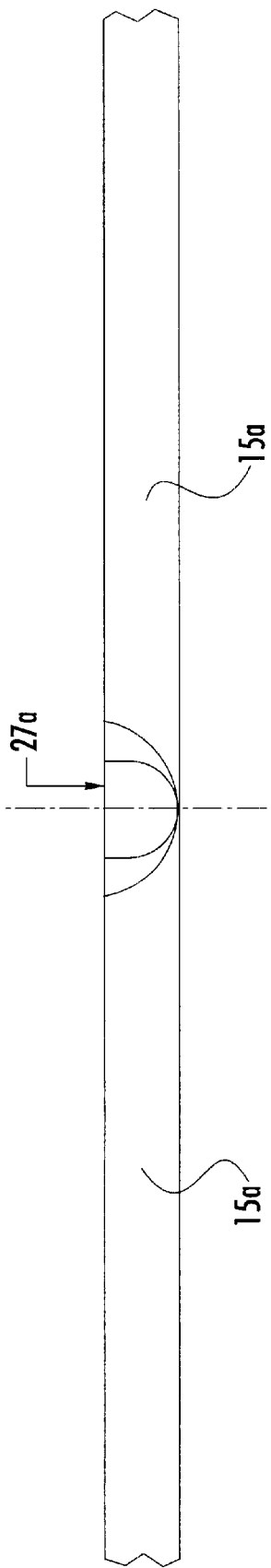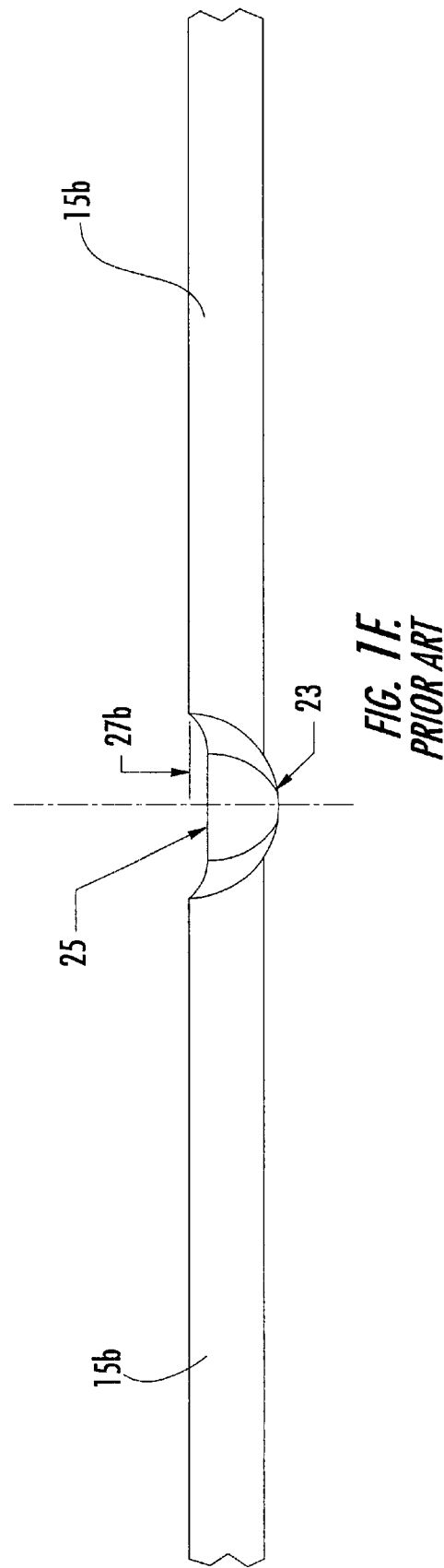

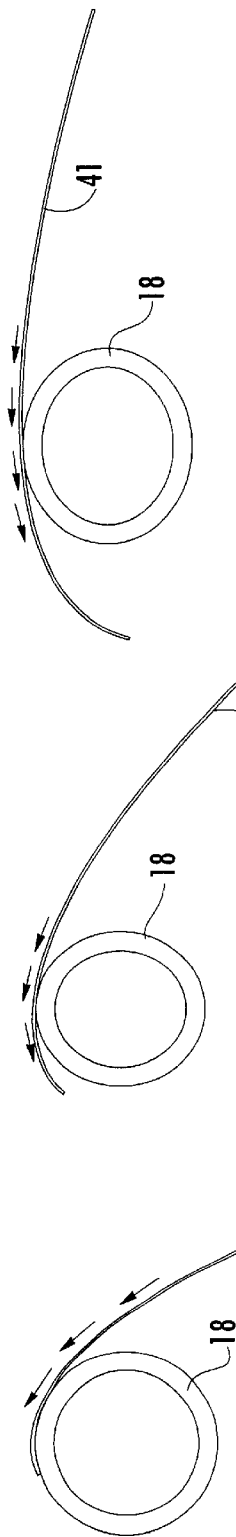
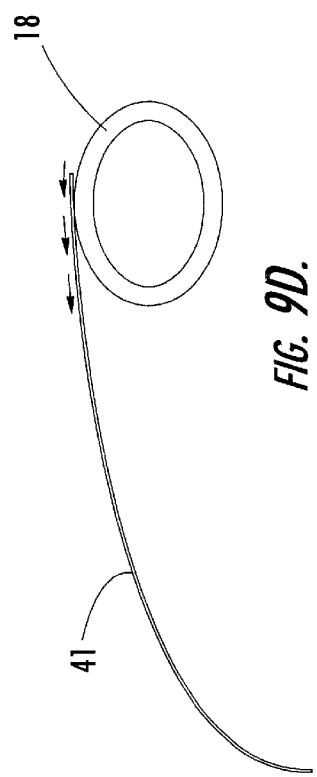

METHOD AND APPARATUS FOR BACKING UP A FRICTION STIR WELD JOINT

FIELD OF THE INVENTION

The present invention relates to friction stir welding and, more particularly, relates to backing up a weld joint during friction stir welding.

BACKGROUND OF THE INVENTION

Friction stir welding is a relatively new process using a rotating tool to join in a solid state two workpieces or to repair cracks in a single workpiece. At present, the process is applied almost exclusively in straight-line welds. For example, such a process is described in U.S. Pat. No. 5,460,317 to Thomas et al., the contents of which are incorporated herein by reference. During friction stir welding a rotating tool is plunged into a workpiece or between two workpieces by a friction stir welding machine to produce the required resistance force to generate sufficient frictional heating to form a region of plasticized material. Upon solidification of the plasticized material, the workpieces are joined along the weld joint. The magnitude of force exerted by the friction stir welding tool on a workpiece is applied over a small, but well defined area of the workpiece, and must be maintained above a prescribed minimum in order to generate the required frictional heating.

To prevent deformation of a workpiece by the force exerted by the friction stir welding tool and maintain dimensional tolerances, the workpiece must have support behind the weld joint over an area at least as large as the imprint of the welding tool. Additionally, because the frictional heat generated by the welding tool plasticizes the material within the weld joint, the plasticized material must be constrained to prevent the material from flowing out of the weld joint and to provide a weld joint having the desired surface finish. When friction stir welding relatively flat workpieces, the weld joint can be supported by a continuous planar surface, such as a steel plate, positioned underneath the workpieces to be joined.

When friction stir welding workpieces having curvilinear geometries, providing adequate support to the weld joint becomes problematic because the curvilinear geometry makes it more difficult to provide a continuous support surface. Such welds are often necessary when fabricating military and commercial aircraft and rocket fuel tanks. In certain instances, a built-up structure can be secured to the interior surfaces of the curvilinear workpieces prior to friction stir welding. However, weight restrictions and/or design parameters often require a finished assembly having a smooth interior surface. As such, the built-up structure must be removed, for example, by machining, which is time consuming and labor intensive and increases the manufacturing cost of the finished assembly.

In seeking better methods for welding curvilinear geometries, a solid backing wheel has been proposed. For example, referring to FIGS. 1A and 1B, there is illustrated one design of a welding apparatus 11 having a solid wheel 13 for backing a friction stir weld joint between two curvilinear structural members 15, as is known in the art. In order to produce a curvilinear weld joint between a pair of curvilinear structural members 15, the friction stir weld tool 17 is positioned in the joint opposite the solid wheel 13. Assuming ideal structural members 15 without deflection or deformation, the joint between the structural members will meet the solid wheel 13 at a tangent point 19, leaving slender gaps 21 on either side of the wheel directly under the shoulder 17a of the friction stir welding tool 17. As illustrated in FIG. 1B, the friction stir welding tool 17 is typically positioned at an angle a with the plane extending from the center of the solid wheel 13 through the tangent point 19. During friction stir welding, the welding force crushes the gaps between the structural members 15 and the solid wheel 13. As the joint cools from welding temperatures, the joint can retain an instantaneous and permanent set in the shape the structural members 15 were welded, i.e., the curvature of the solid wheel 13, which can result in a distorted joint that adversely affects the tolerances of the resulting structural assembly.

In addition, referring to FIG. 1B, the curvature of the solid wheel 13 typically results in some amount of material 23 being extruded through the joint away from the shoulder 17a of the friction stir welding tool 17. As the material 23 is extruded, the shoulder 17a of the friction stir welding tool 17 forms a trough 25 on the side of the joint facing the shoulder, which can weaken the joint. When the centerline of the friction stir welding tool 17 is in line with the center of the solid wheel 13, the tool is aligned at the top dead center ("TDC") of the wheel. Referring to FIGS. 1C and 1D, if the tool 17 is ahead or behind of TDC of the wheel, the tool receives less support on the slope of the wheel. Both cases cause extrusion of material 23 away from the shoulder 17a of the tool 17. As illustrated in FIG. 1C, in the worst case the tool is ahead of TDC and the extrusion 23 builds a "ramp" that wedges under the tangent point of the wheel 13 and lifts the structural members 15 away from the wheel. If the tool 17 is ahead of TDC, the shoulder 17 will also dig a relatively deep trough 25 in the surface of the structural members 15 facing the shoulder. Where the tool is behind TDC, the shoulder 17a extrudes metal 23 away from the shoulder, but the extent of distortion of the structural members 15 is typically not as severe. Reducing the diameter of the solid wheel 13 typically increases the distortion of the structural members 15, as well as the extrusion 23 of material from the backside of the joint, since the slope of the wheel becomes steeper. Increasing the diameter of the solid wheel 13 results in heavier, more complex tooling and can, in certain instances, result in difficulty extracting the wheel from the resulting structural assembly.

Referring to FIGS. 1E and 1F, where there is illustrated a comparison of a friction stir weld joint 27a formed by welding flat plates 15a with a flat backing and a weld joint 27b formed by welding curvilinear plates 15b using a solid backing wheel. As illustrated in FIG. 1E, the backside of the weld joint 27a of the flat plates 15a is flush with the original profile of the structural members 15. In contrast, as illustrated in FIG. 1F, the weld joint formed between the curvilinear members 15 exhibits extrusion 23 on the backside of the joint away from the shoulder and a severe depression or trough 25 on the side of the joint facing the shoulder.

Thus, there is a need for an improved backing device for weld joints formed by friction stir welding workpieces having curvilinear geometries. The backing device should be capable of effectively supporting a weld joint and constraining the plasticized material within the weld joint during friction stir welding. Additionally, the backing device should be easily adaptable to varying workpiece geometries.

SUMMARY OF THE INVENTION

The present invention provides an apparatus and an associated method for backing up weld joints formed by friction stir welding workpieces having curvilinear geometries. The backing device includes a backing ring defining a contact zone. Advantageously, the backing ring has sufficient flexibility such that at least a portion of the contact zone defined by the backing ring engages the weld joint opposite the friction stir welding tool to thereby support the weld joint and to constrain the plasticized material within the weld joint.

The backing device also includes a restraining member in operable communication with the backing ring to urge the central axis of the backing ring and, thus, the contact zone of the backing ring, toward the weld joint. According to one embodiment, the restraining member is in operable communication with the backing ring through a spring member and a plurality of bogies. The plurality of bogies rotatively engage at least a portion of the backing ring and urge the contact zone of the backing ring toward the weld joint. The spring member at least partially receives the plurality of bogies and is in operable communication with the retaining member. The spring member urges the bogies toward the backing ring.

According to one embodiment, the backing ring defines an opening therethrough. Advantageously, the backing device can include at least one jet for injecting coolant fluid into the opening in the backing ring to convectively transfer heat from the weld joint. The backing device can also include a retaining roller extending at least partially through the opening defined in the backing ring opposite the bogies. The retaining roller rotatively engages at least a portion of the backing ring such that the backing ring is slidably retained between the bogies and the retaining roller. The retaining roller may comprise one or more bogies.

The backing device includes a sensor, such as a strain-gage load cell, a piezoelectric load cell, a dynamometer, a pneumatic load cell, or a hydraulic load cell, for measuring the magnitude of force exerted by the contact zone of the backing ring upon the weld joint. According to one embodiment, the apparatus also includes a computing means in electrical communication with the sensor.

Advantageously, the backing device also includes means, responsive to the sensor and in operable communication with the restraining member, for moving the restraining member relative to the weld joint in order to modify the force exerted by the contact zone of the backing ring upon the weld joint. According to one embodiment, the moving means responsive to the sensor includes a drive assembly and a motor in operable communication with the drive assembly. The drive assembly can include a belt drive or a gear drive. According to another embodiment, the moving means comprises an actuator assembly, such as a pneumatic actuator arm or a hydraulic actuator arm. In still another embodiment, the moving means includes a power screw.

The backing device can also include means for rotating the backing ring to thereby maintain the contact zone of the backing ring opposite the friction stir welding tool during formation of the weld joint. According to one embodiment, the rotating means includes a drive assembly and a motor in operable communication with the drive assembly. As before, the drive assembly can include a belt drive or a gear drive.

The present invention also provides an apparatus for friction stir welding weld joints in workpieces having curvilinear geometries. According to one embodiment, the friction stir welding device includes a milling machine having a spindle in rotatable communication with a friction stir welding tool, which frictionally engages a workpiece to thereby form a weld joint. The friction stir welding device also includes a backing ring having a central axis and defining a contact zone. Advantageously, at least a portion of the contact zone defined by the backing ring engages the weld joint opposite the friction stir welding tool to thereby provide support behind the weld joint and to constrain the plasticized material within the weld joint.

The friction stir welding device includes at least one sensor for measuring the magnitude of force exerted upon the workpiece. The friction stir welding device can include a computing means in electrical communication with the at least one sensor, such as a strain-gage load cell, a piezoelectric load cell, a dynamometer, a pneumatic load cell, or a hydraulic load cell. According to one embodiment, the at least one sensor includes a first sensor for measuring the magnitude of force exerted by the contact zone of the backing ring upon the weld joint and a second sensor for measuring the magnitude of force exerted by the friction stir welding tool upon the workpiece.

Advantageously, the friction stir welding device also includes means, responsive to the at least one sensor and in operable communication with the backing ring, for moving the central axis of the backing ring relative to the weld joint in order to modify the force exerted by the contact zone of the backing ring upon the weld joint. According to one embodiment, the moving means responsive to the at least one sensor includes a drive assembly and a motor in operable communication with the drive assembly. The drive assembly can include a belt drive or a gear drive. According to another embodiment, the moving means comprises an actuator assembly, such as a pneumatic actuator arm or a hydraulic actuator arm. In still another embodiment, the moving means includes a power screw.

The friction stir welding device can also include means for rotating the backing ring to thereby maintain the contact zone of the backing ring opposite the friction stir welding tool during formation of the weld joint. According to one embodiment, the rotating means includes a drive assembly, such as a belt drive or a gear drive, and a motor in operable communication with the drive assembly.

The present invention also provides a method of friction stir welding a workpiece, comprising the steps of mounting a friction stir welding tool to a rotatable spindle such that the friction stir welding tool rotates with the spindle. The friction stir welding probe is then positioned adjacent to a first side of a workpiece. A backing ring defining a central axis is positioned adjacent to a second side of the workpiece opposite the friction stir welding tool. The friction stir welding tool is then inserted into the first side of the workpiece to form a weld joint. Concurrently with the inserting step, the central axis of the backing ring is moved toward the weld joint such that the backing ring defines a contact zone at least partially engaging the weld joint opposite the friction stir welding tool. The magnitude of the force exerted upon the workpiece is measured. According to one embodiment, the measuring step includes measuring the force exerted by the friction stir welding tool upon the workpiece and measuring the force exerted by the contact zone of the backing ring upon the weld joint. The distance between the central axis of the backing ring and the weld joint is then adjusted to modify the force exerted by the contact zone of the backing ring on the weld joint. The friction stir welding tool is moved through the workpiece. Concurrently with the moving step, the backing ring is rotated along the second side of the workpiece such that the contact zone of the backing ring remains opposite the friction stir welding tool. According to one embodiment, coolant fluid is injected into an opening defined by the backing ring to convectively transfer heat from the weld joint. In another embodiment, at least one bogie is moved relative to the backing ring to thereby modify the force exerted by the contact zone of the backing ring upon the weld joint.

Accordingly, there has been provided an apparatus and associated method allowing for the formation of uniform weld joints in workpieces having curvilinear geometries. In particular, the backing device is capable of effectively supporting a weld joint to thereby maintain the manufacturing tolerances of the workpiece, as well as to constrain the plasticized material within the weld joint. Additionally, the backing ring of the backing device is sufficiently flexible so that it can easily adapt to varying workpiece geometries.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and wherein:

FIG. 1E is a cross-sectional view illustrating a friction stir weld joint formed by welding flat plates with a flat backing, as is known in the art;

FIG. 1F is a cross-sectional view illustrating a friction stir weld joint formed by welding curvilinear plates using a solid backing wheel, as is known in the art;

FIGS. 9A–9D are elevations illustrating modifications in the shape or configuration of the backing ring during welding of an airfoil wherein the arrows show the direction of motion of the workpiece;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
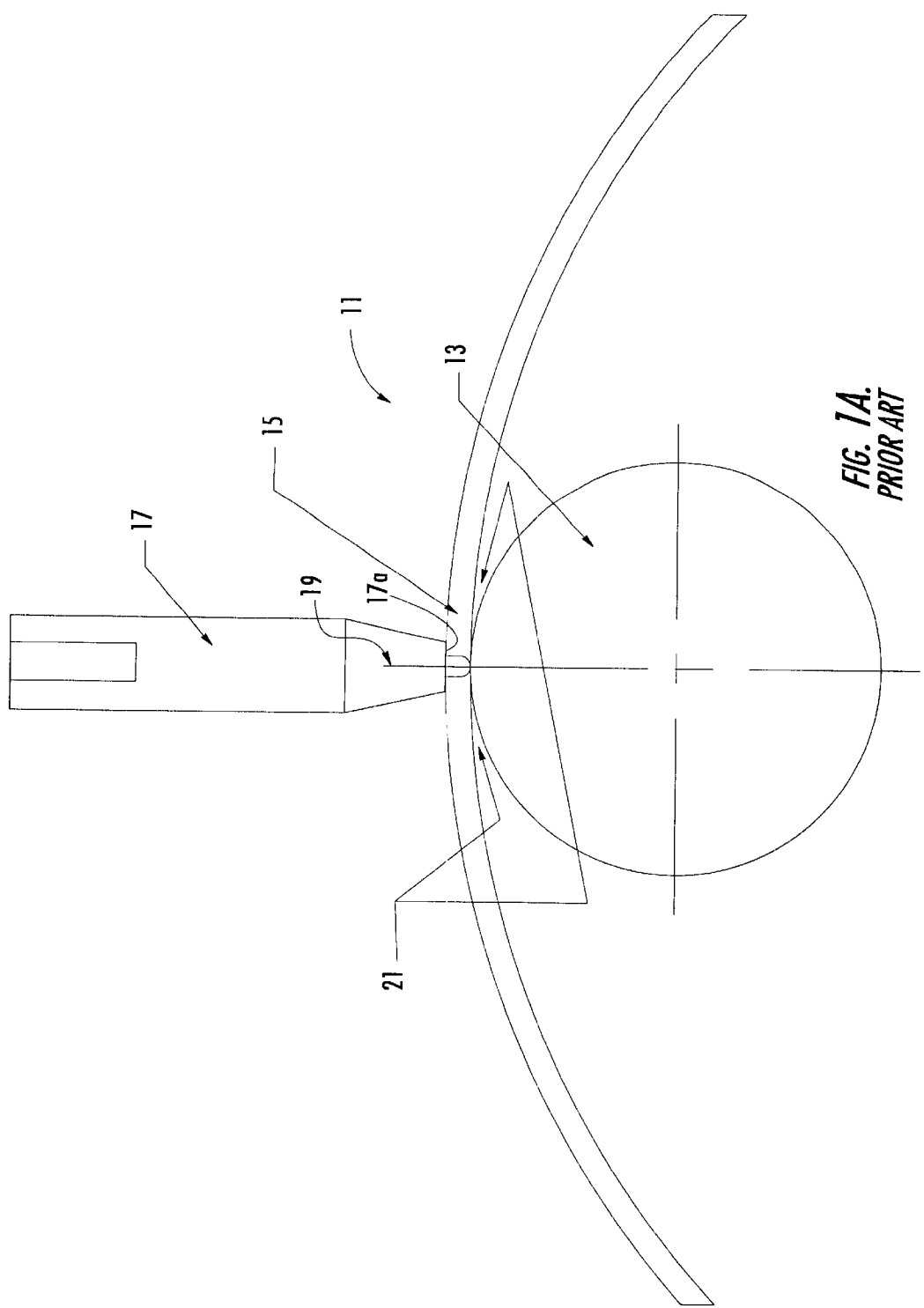
FIG. 1A is a partial elevation illustrating one embodiment of a welding device having a solid backing wheel, as is known in the art.
Figure 1B:
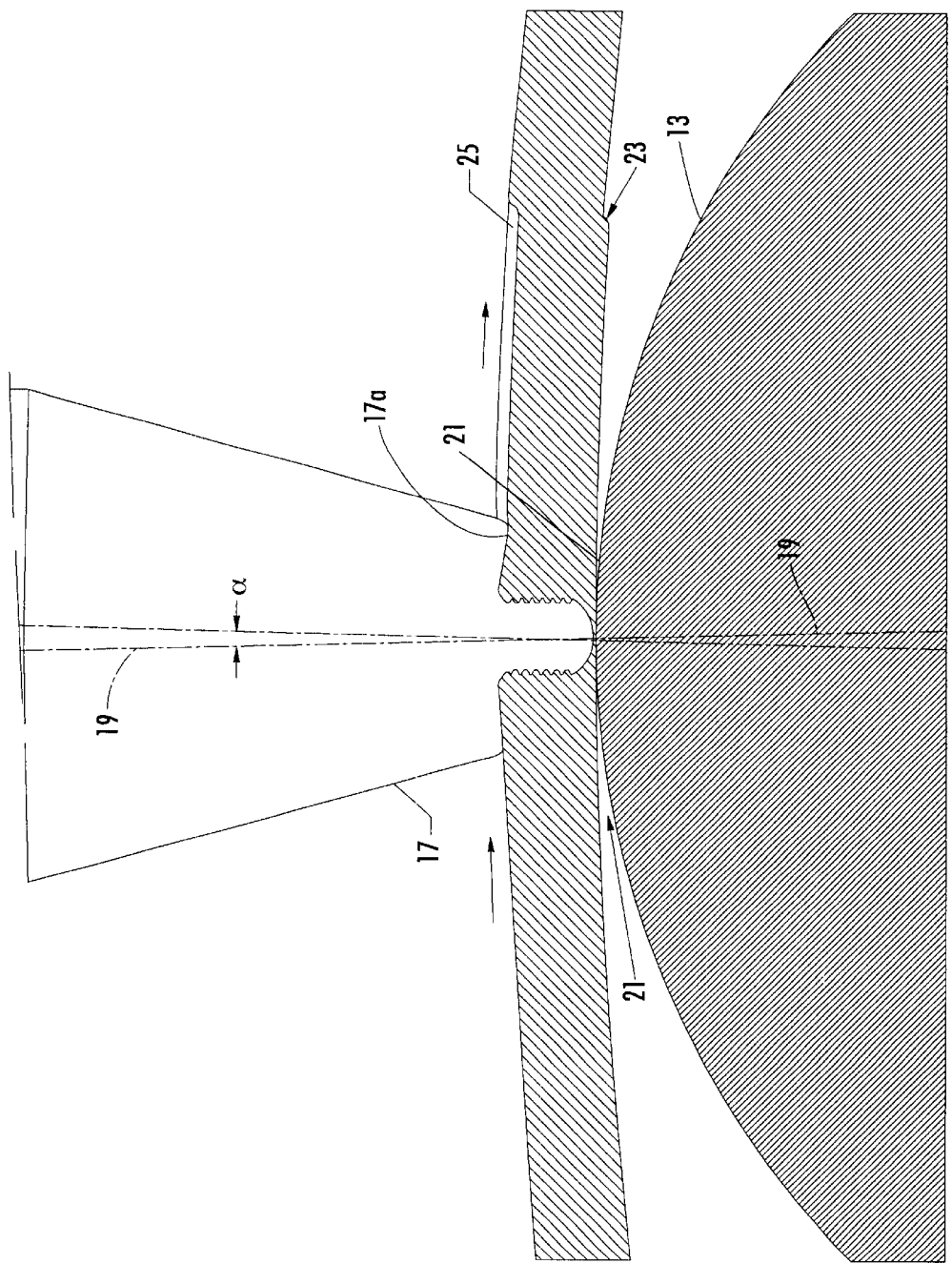
FIG. 1B is a cross-sectional view illustrating the welding device of FIG. 1A wherein the arrows indicate the direction of motion of the structural members.
Figure 1C:
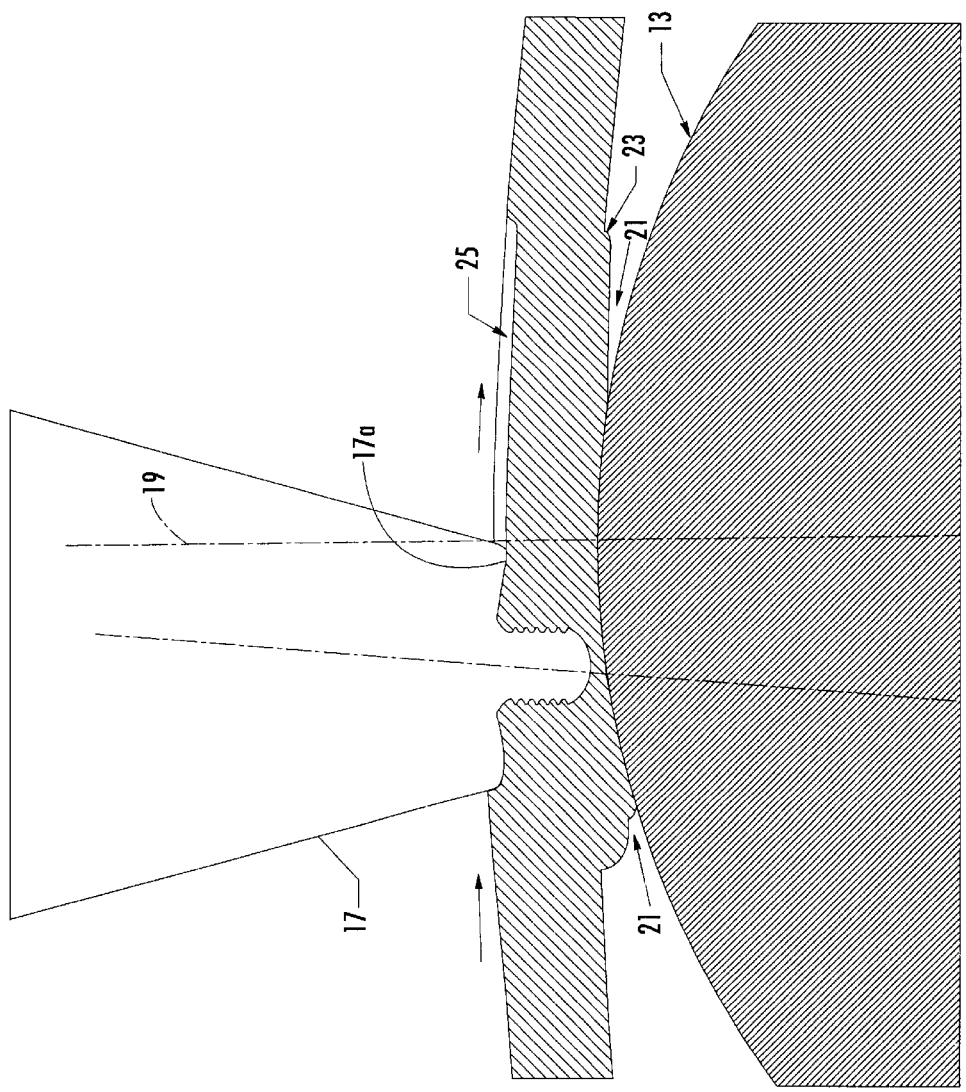
FIG. 1C is a cross-sectional view illustrating the welding device of FIG. 1A wherein the arrows indicate the direction of motion of the structural members and the friction stir welding tool is ahead of top dead center.
Figure 1D:
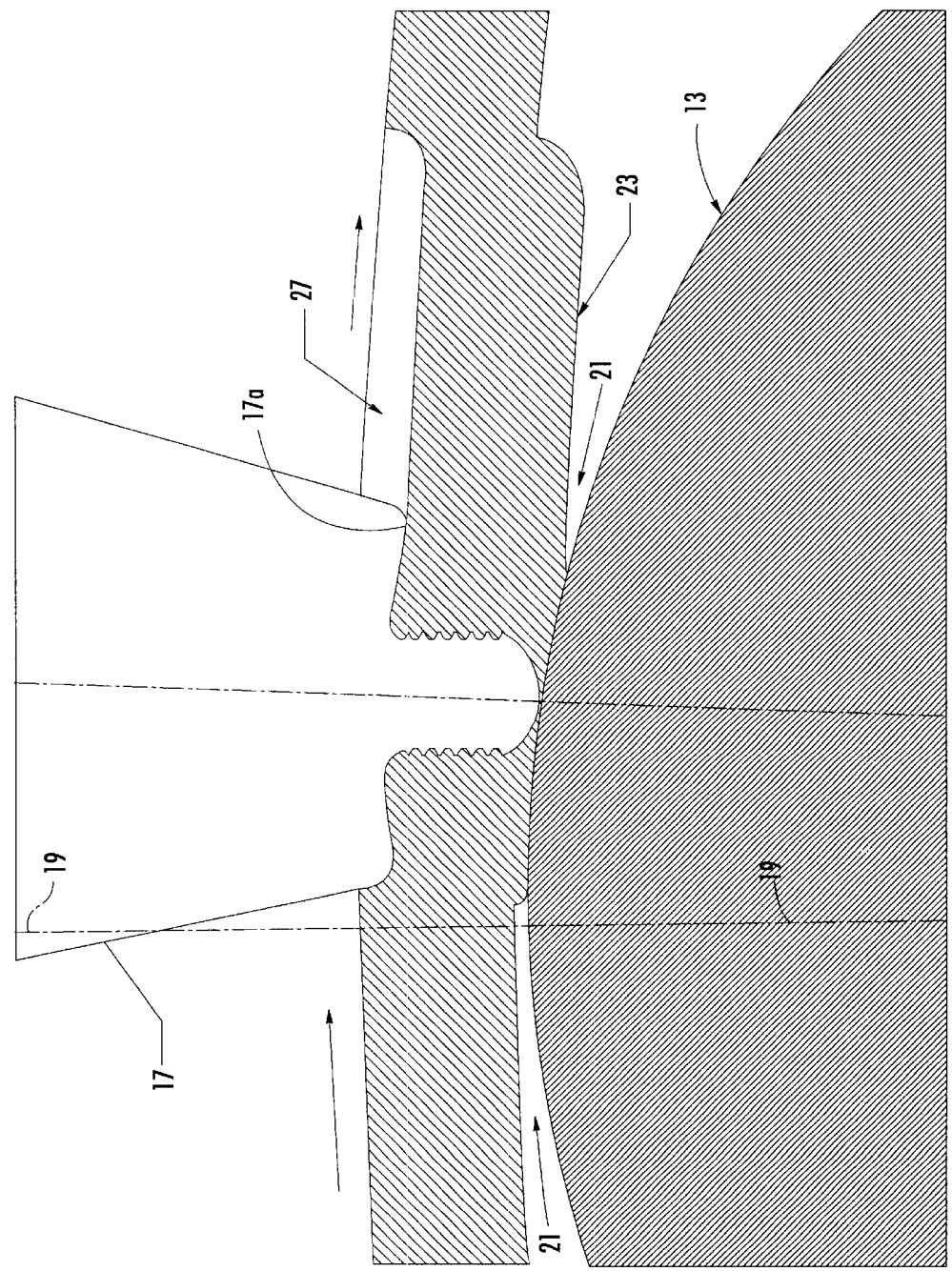
FIG. 1D is a cross-sectional view illustrating the welding device of FIG. 1A wherein the arrows indicate the direction of motion of the structural members and the friction stir welding tool is behind top dead center.
Figure 2:
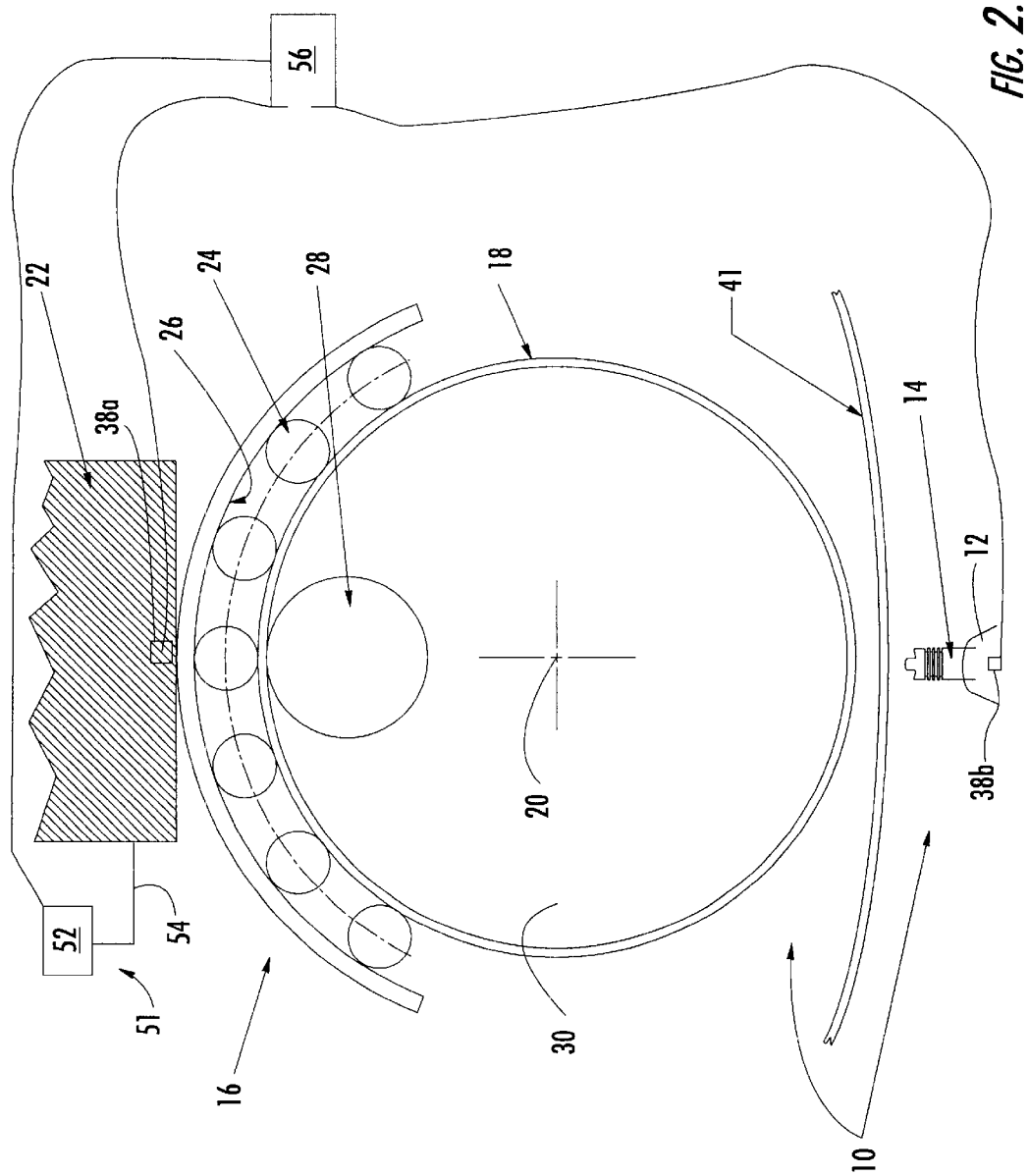
FIG. 2 is a partial elevation of a friction stir welding device, according to one embodiment of the present invention, illustrating the positioning of the backing device and friction stir welding tool prior to commencing friction stir welding.
Figure 3:
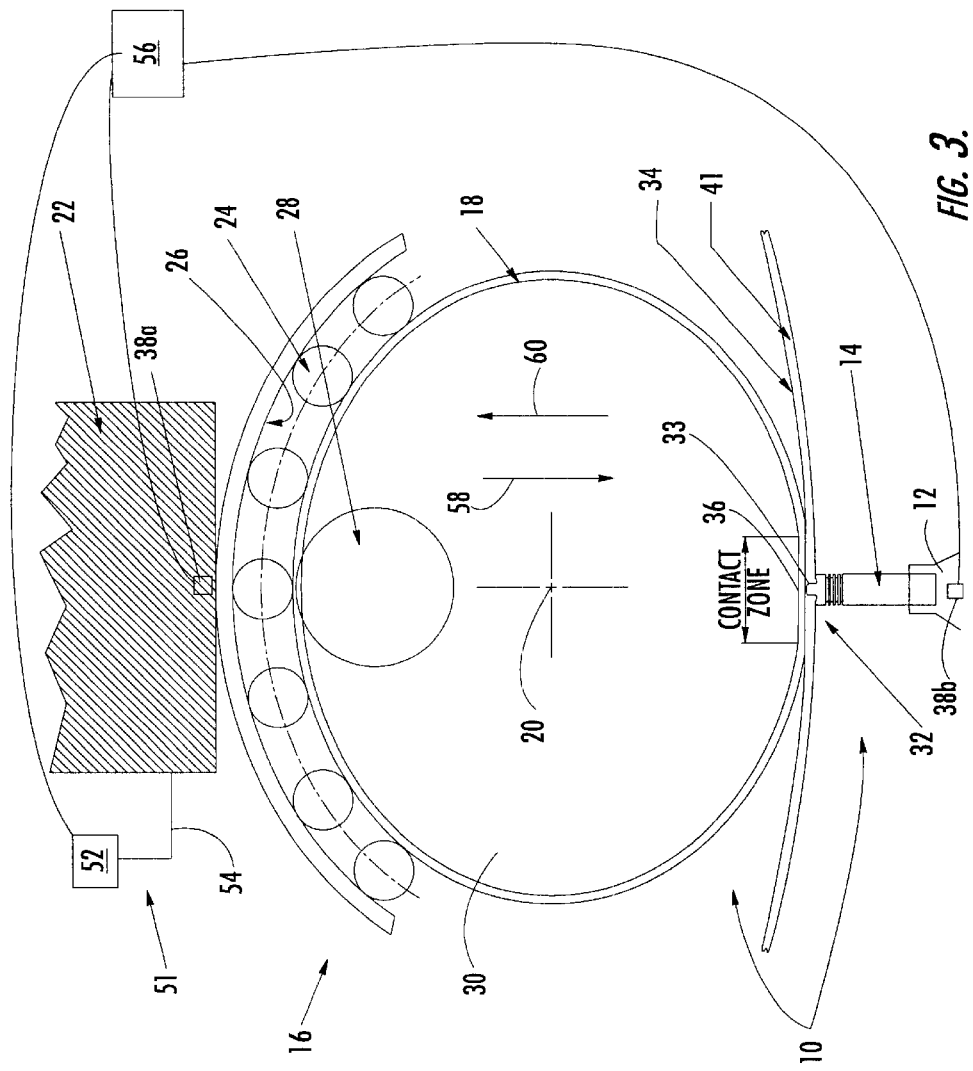
FIG. 3 is a partial elevation of the friction stir welding device of FIG. 2 illustrating the positioning of the backing device and friction stir welding tool during friction stir welding.

Referring now to the drawings and, in particular, to FIGS. 2 and 3, there is shown a friction stir welding device 10, according to one embodiment of the present invention, for friction stir welding a workpiece 41. While the friction stir welding device 10 of the present invention is particularly suited for friction stir welding workpieces having curvilinear geometries, the friction stir welding device can also be used to friction stir weld relatively flat workpieces as well. The friction stir welding device 10 includes a milling machine (not shown) having a spindle 12 in rotatable communication with a friction stir welding pin tool or probe 14, and a backing device 16. A comparison of FIGS. 2 and 4 illustrates that the positioning of the welding tool 14 relative to the workpiece 41 and backing device 16 can be varied depending on the particular application.

The backing device 16 includes a backing ring 18 having a central axis 20. The backing ring 18 preferably is a hollow circular ring constructed of a material having high strength and ductility, such as steel. According to one embodiment, the backing ring 18 can be constructed of a spring steel, such as AISI 1095, AISI 6150, AISI 9260, AISI 5150, AISI 8650. To prevent corrosion of the backing ring 18 and to avoid contaminating the weld joint, the backing ring preferably includes a hard, inert coating. According to one embodiment, the coating is an electroplated coating such as hard chrome, decorative chrome, or nickel. In another embodiment, the backing ring is coated by depositing stainless steel, tungsten carbide, or nickel alloy powder by high velocity plasma-spray deposition, as is known in the art.

Figure 4:
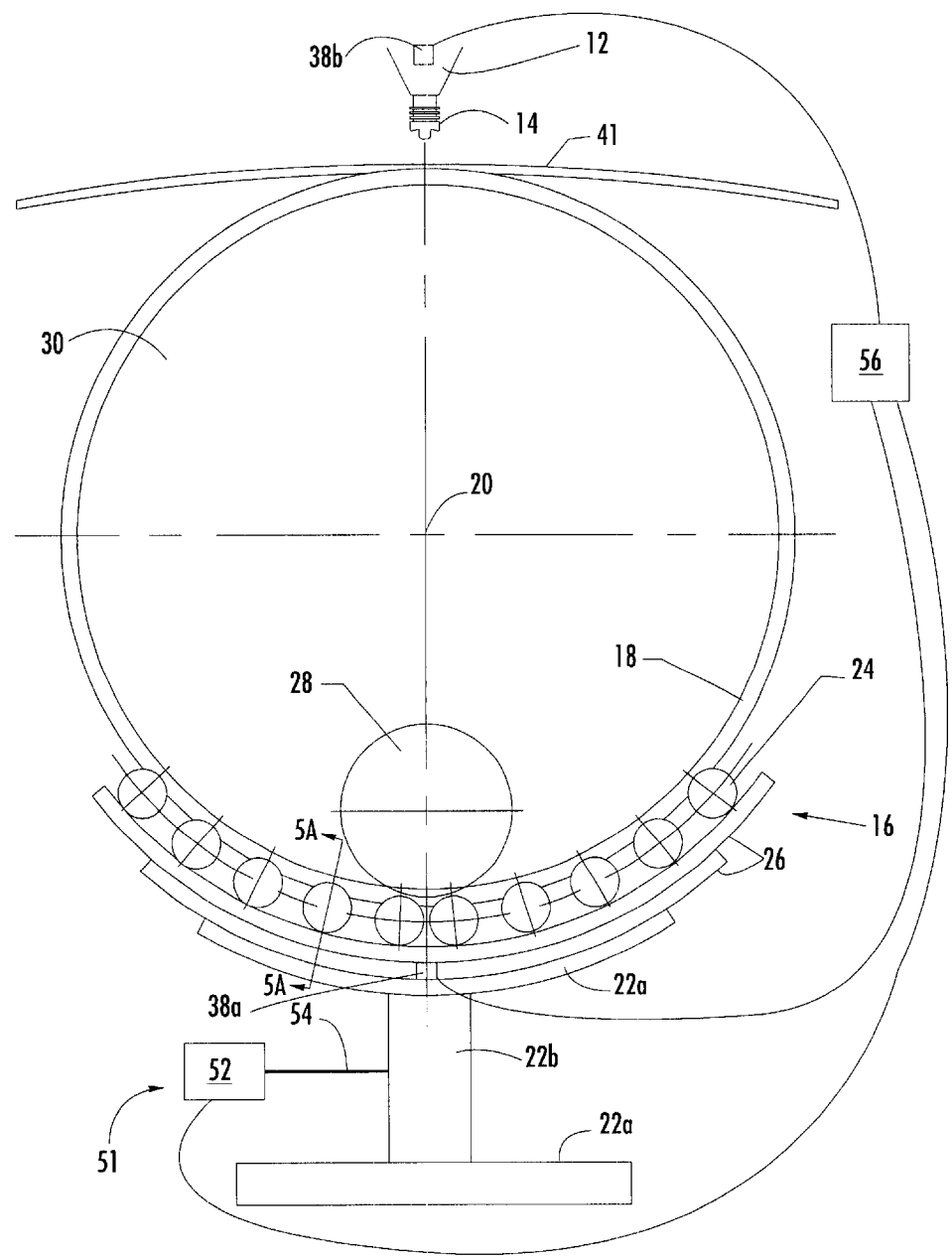
FIG. 4 is a partial elevation of a friction stir welding device, according to another embodiment of the present invention, illustrating the positioning of the backing device and friction stir welding tool prior to commencing friction stir welding.

As illustrated in FIGS. 2, 3, and 4, the backing device 16 includes a restraining member 22 in operable communication with the backing ring 18. As illustrated in FIG. 4, the restraining member 22 can include a base 22a, a pedestal 22b and a contoured support member 22c. As discussed more fully below, the pedestal 22b preferably is adapted to be raised or lowered depending on the dimensions and configuration of the workpiece 41. According to one embodiment, the restraining member 22 is in operable communication with the backing ring 18 through a plurality of bogies 24 and one or more spring members 26.

Figures 5A, 5B:
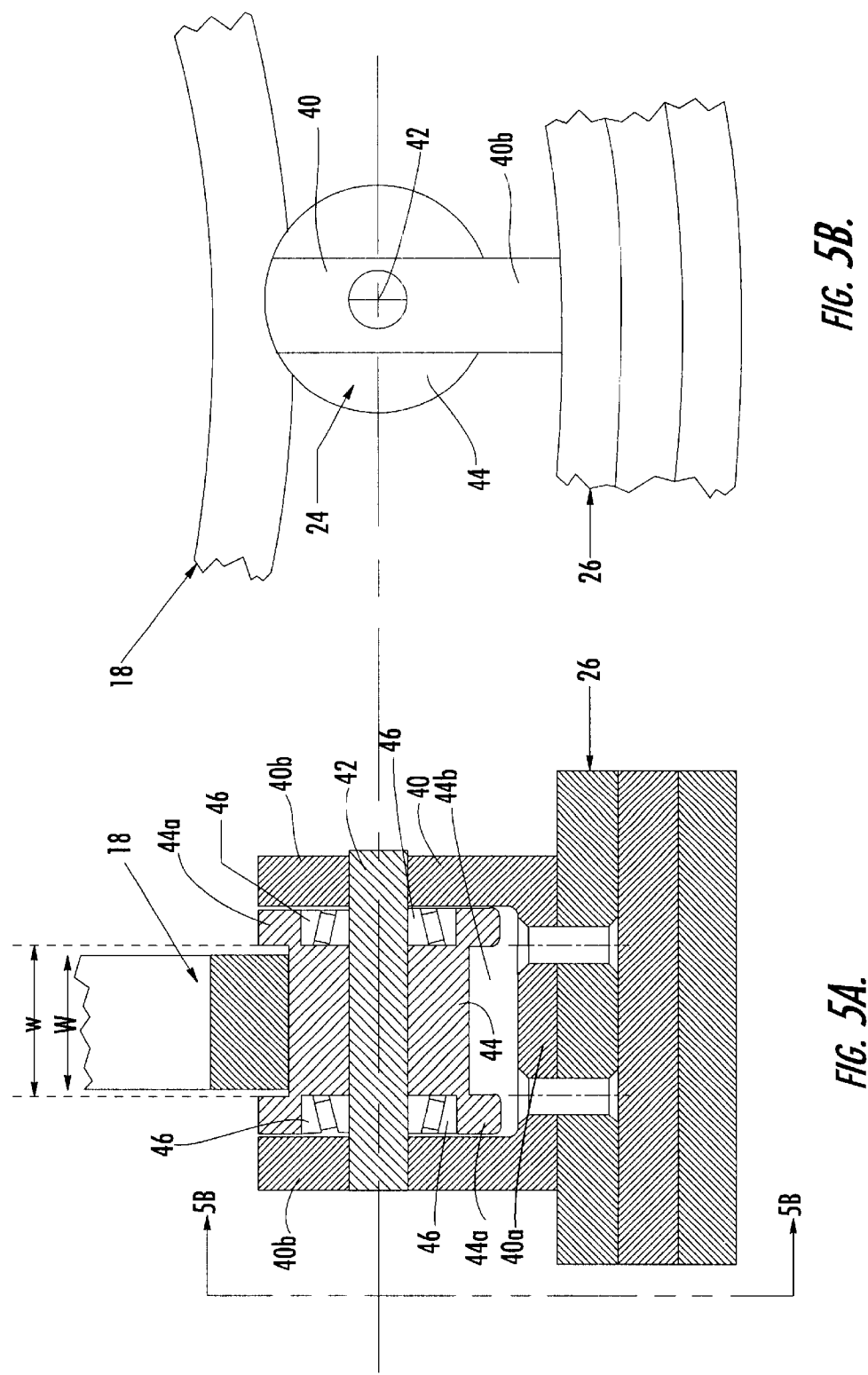
FIG. 5A is a partial cross-sectional view of the backing ring and bogie of FIG. 4 along lines 5A—5A.
FIG. 5B is partial elevation of the backing ring and bogie of FIG. 5A along lines 5B—5B.
Figure 6:
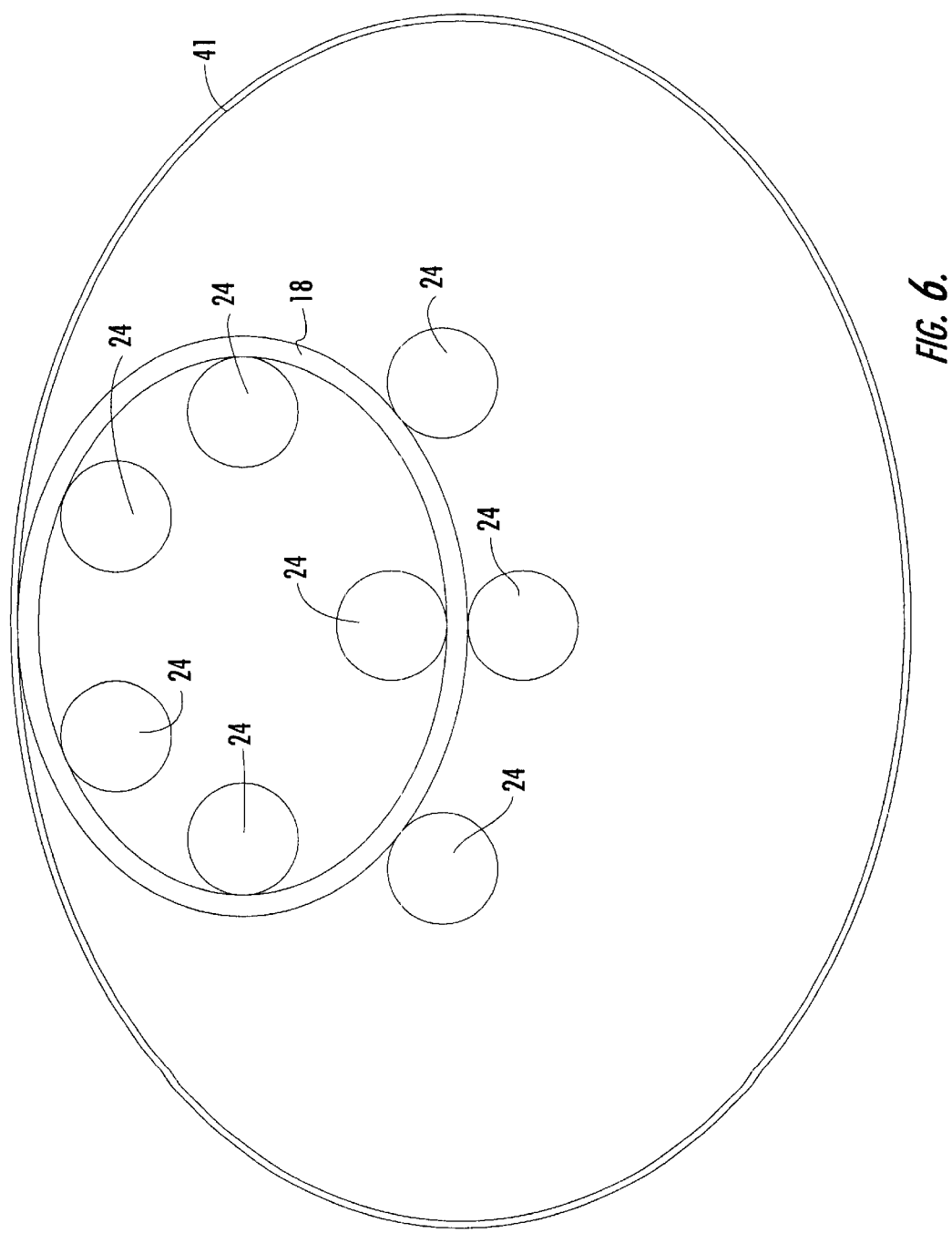
FIG. 6 is a partial elevation of a backing device and workpiece, according to another embodiment of the present invention.
Figure 7:
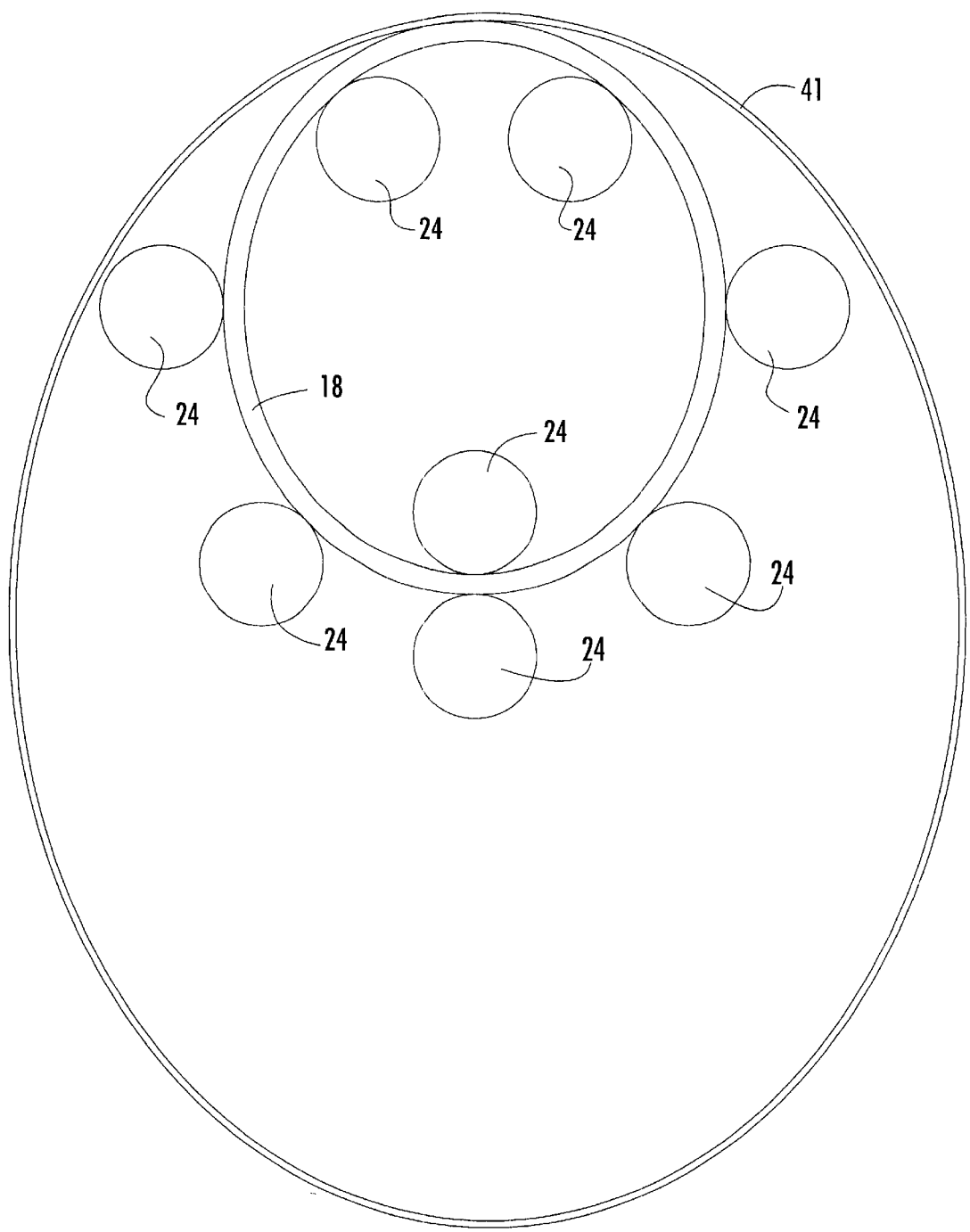
FIG. 7 is a partial elevation of a backing device and workpiece, according to another embodiment of the present invention.

The bogies 24 rotatively engage at least a portion of the backing ring 18 to provide lateral restraint or support to the backing ring 18 and to modify the shape of the backing ring to match the configuration of the particular workpiece 41 being welded. As illustrated in FIGS. 5A and 5B, each bogie 24 preferably includes a generally U-shaped mount 40 having a base 40a with first and second flanges 40b extending from opposite ends of the base, an axle or pin 42 extending between the first and second flanges, and a wheel 44 rotatably positioned on the axle using opposing sets of heavy tapered roller bearings 46. The wheel 44 preferably includes raised sides 44a defining a recess 44b therebetween structured to engage the backing ring 18 thereby preventing lateral movement of the backing ring. The width W of the recess 44a is slightly larger than the width w of the backing ring 18. As illustrated in FIGS. 6 and 7, a plurality of bogies 24 can be provided both externally and internally of the backing ring 18 to stretch, flex and support the backing ring to match the configuration of the particular workpiece 41 being welded.

According to one embodiment of the present invention, as illustrated in FIG. 4, one or more spring members 26, such as leaf springs, at least partially receive the plurality of bogies 24 and retain the bogies in rotative engagement with the backing ring 18. The spring members 26 can be secured to the contoured support member 22c defined by the restraining member 22 using suitable fasteners. Each spring member 26 is positioned between the restraining member 22 and the bogies 24 such that movement of the restraining member toward the workpiece 41 urges the spring member and bogies toward the backing ring 18 thereby urging the backing ring toward and into contact with the workpiece. As illustrated in FIG. 5A, the base 40a of the mount 40 of each bogie 24 can be secured to the one or more spring members 26 using suitable fasteners 48, such as bolts. As discussed more fully below, movement of the restraining member 22 away from the workpiece 41 preferably urges the spring member 26 and bogies 24 away from the backing ring 18 thereby allowing the backing ring to be moved away from the workpiece 41 to adjust the force applied by the backing ring against the workpiece.

As illustrated in FIGS. 2, 3, and 4, the backing device 16 can also include one or more retaining rollers 28 extending at least partially through an opening 30 defined by the backing ring 18 opposite the bogies 24. Each retaining roller 28 rotatively engages at least a portion of the backing ring 18 such that the backing ring is slidably retained between the bogies 24 and the retaining roller. As noted above and as illustrated in FIGS. 6 and 7, the backing device 16 can include bogies 24 internally of the backing ring 18 to stretch, flex and support the backing ring to match the configuration of the particular workpiece 41 being welded, in which case the internal bogies would comprise the retaining rollers 28. Each retaining roller 28 is preferably connected to the restraining member 22 through a suitable linkage (not shown) to thereby retain the backing ring 18 when the backing device 16 is not in operation. Movement of the restraining member 22 away from the workpiece 41 moves the retaining roller or rollers 28 toward the portion of the backing ring 18 engaged between the retaining roller(s) and the plurality of bogies 24 such that the backing ring is moved away from the workpiece to thereby adjust the force applied by the backing ring to the workpiece.

Figure 8:
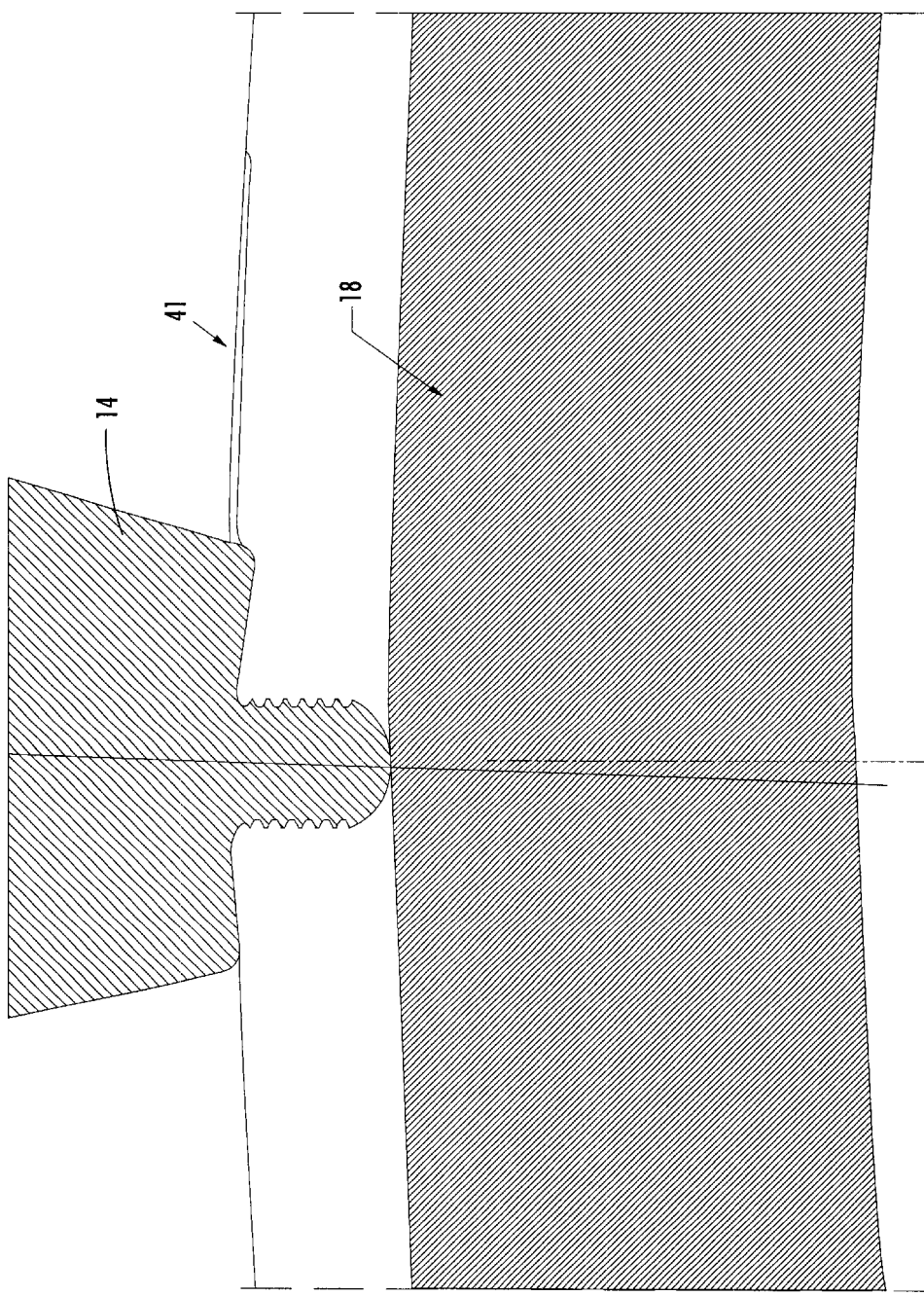
FIG. 8 is a cross-sectional view of a friction stir welding tool, workpiece and backing ring, according to one embodiment of the present invention.

As illustrated in FIG. 3, during friction stir welding the friction stir welding tool 14 is plunged into a first side 32 of a workpiece 41 to form a weld joint 33. Simultaneously, the backing ring 18 of the backing device 16 is moved into contact with the opposite second side 34 of the workpiece 41 by moving the restraining member 22 toward the workpiece. As illustrated in FIGS. 9A–9D, which show the progression of an curvilinear airfoil 41 about the backing ring 18 during welding, the backing ring has sufficient flexibility such that the backing ring deflects into the shape or configuration of the workpiece as the load applied by the restraining member 22, spring member(s) 26, and plurality of bogies 24 forces the backing ring against the second side 34 of the workpiece. Initially, the backing ring 18 will make contact with the workpiece 41 along a line extending the width W of the backing ring, see FIG. 5A. In the two dimensional representation shown in FIG. 2, the portion of the backing ring 18 initially contacting the workpiece 41 would appear as a single point. Advantageously, as the backing ring 18 is forced against the workpiece 41, the portion of the backing ring in contact with the workpiece is transformed from a line extending the width W of the backing ring to an area thereby defining a contact zone 36. In the two dimensional representation shown in FIG. 3, the contact zone 36 appears as a linear region. At least a portion of the contact zone 36 is in contact with the weld joint 33 opposite the friction stir welding tool 14 to thereby provide support behind the weld joint and to constrain the plasticized material within the weld joint thereby preventing extrusion of material from the backside of the joint. As illustrated in FIG. 8, the backing ring 18 should be sufficiently flexible such that the backing ring deflects to form a contact zone 36 corresponding to the shape or profile of the surface of the workpiece 41 proximate to the weld joint 33 to thereby eliminate the gaps below the shoulder of the friction stir welding tool 14. With this flexibility, the backing ring 18 can easily adapt to workpieces 41 having varying curvilinear geometries without distorting the joint upon cooling.

The backing device 16 includes means for moving 51 the restraining member 22 relative to the workpiece 41 in order to modify the force exerted by the contact zone 36 on the weld joint 33. Regarding the force exerted by the contact zone 36 on the "weld joint," it is intended that this force includes the force exerted by the backing ring over the entire surface area of the contact zone, which force is necessarily exerted upon both the workpiece 41 and the weld joint 33. According to one embodiment, the backing device 16 includes a drive assembly 54 and a motor or servomotor 52 in operable communication with the drive assembly. For example, the drive assembly can include a belt drive or a gear drive. According to another embodiment, the means for moving 51 the restraining member 22 comprises a power screw. According to still another embodiment, the means for moving 51 the restraining member 22 comprises an acutator assembly, such one or more pneumatic actuator arms and/or one or more hydraulic actuator arms.

In another embodiment (not shown), the backing device 16 can also include means for moving the individual bogies 24 relative to the backing ring 18 and, in some cases, the restraining member 22 to further stretch, flex and support the backing ring 18 to thereby modify the force exerted by the backing ring 18 upon the weld joint. According to one embodiment, the backing device 16 can include a suitable linkage between the backing ring 18 and corresponding bogie or bogies, a drive assembly and a motor in operable communication with the drive assembly. For example, the drive assembly can include a belt drive or a gear drive. According to another embodiment, the means for moving the individual bogies can include a power screw. According to still another embodiment, the means for moving the individual bogies can include an acutator assembly, such as a pneumatic actuator arm or a hydraulic actuator arm. The backing device 16 preferably includes a computing means, such as a computer or controller operating under software control, that is in electrical communication with the moving means for moving the individually bogies.

The friction stir welding device 10 also includes at least one sensor 38 for measuring the force exerted upon the weld joint 33. In one embodiment, as illustrated in FIG. 4, the backing device 16 includes a first sensor 38a for measuring the magnitude of force exerted by the contact zone 36 of the backing ring 18 upon the weld joint 33. A second sensor 38b, preferably built into the spindle 12 of the milling machine (not shown), is provided for measuring the magnitude of force exerted by the friction stir welding tool 14 upon the workpiece 41. The first and second sensors 38a,b can include one or more strain gages. A plurality of strain gages may be used to form a strain-gage load cell for greater accuracy. Strain gages have an advantage over piezoelectric gages in that strain gages do not leak the signal and deliver a real DC signal. However, the first and second sensors 38a,b may also include other types of sensors, such as piezoelectric load cells, dynamometers for measuring torque, pneumatic load cells, or hydraulic load cells, all of which are well known in the art. In another embodiment in which a servomotor in conjunction with either a belt drive or gear drive serves as the moving means for moving the restraining member 22 relative to the workpiece 41, the servomotor current may be used as a measure of the force of the contact zone 36 of the backing ring 18 upon the weld joint 33 since the whole feed drive chain is reasonably friction free. In other words, the axial force of the contact zone 36 of the backing ring 18 may be resolved from the current required to move the restraining member 22.

Preferably, the friction stir welding device 10 also includes a computing means 56, such as a computer or controller operating under software control. The computing means is in electrical communication with both the at least one sensor 38 and the moving means so as to automatically move the restraining member 22 toward or away from the weld joint 33 being formed in the workpiece 41. In an alternate embodiment (not shown), the controls for moving the restraining member 22 can be activated manually. In a preferred embodiment, the computing means 56 will also be in electrical communication with the milling machine, however, electrical communication of the computing means with the milling machine is not necessary to practice the invention. The computing means 56 can also be in electrical communication with the moving means for moving the individual bogies 24, as discussed above, to control the movement of the bogies simultaneously with the movement of the restraining member 22.

In operation, the computing means compares the magnitude of the force exerted by the contact zone 36 of the backing ring 18 upon the weld joint 33, as measured by the first sensor 38a, to the magnitude of the force exerted by the friction stir welding tool 14 upon the workpiece, as measured by the second sensor 38b. As discussed above, the force measured by the first sensor 38a actually includes the force exerted by the contact zone 36 on both the workpiece 41 and weld joint 33. The friction stir welding tool 14 typically exerts a force in the range of approximately 100 lbf and 10,000 lbf. For example, for workpiece composed of a ⅜ inch thick 2219-T87 alloy, approximately 8,000 lbf is required. A 0.04 inch thick lap weld will generally require a range between approximately 600 lbf and 1000 lbf, with a preferred range of approximately 600 lbf to 700 lbf. For a 0.5 inch thick butt weld, the force exerted by the friction stir welding tool may be 10,000 lbf. The magnitude of the force exerted by the friction stir welding tool is related to the feed rate, material properties, and the depth of penetration of the friction stir welding tool 14 in the workpiece 41. The computing means compares the magnitude of force exerted on the workpiece 41 and weld joint 33 by the contact zone 36 of the backing ring 18 and the friction stir welding tool 14. If the magnitude of force exerted by the friction stir welding tool 14 is greater than the magnitude of force exerted by the contact zone 36 of the backing ring 18, the computing means instructs the moving means to move the restraining member 22 toward the workpiece 41, as illustrated by the arrow 58 in FIG. 3, thereby moving the central axis 20 of the backing ring towards the weld joint 33 and increasing the magnitude of force exerted by the contact zone on the weld joint. If the magnitude of force exerted by the friction stir welding tool 14 is less than the magnitude of force exerted by the contact zone 36 of the backing ring 18, the computing means instructs the moving means to move the restraining member 22 away from the workpiece 41, as illustrated by the arrow 60 in FIG. 3, thereby moving the central axis 20 of the backing ring away from the weld joint 33 and decreasing the magnitude of force exerted by the contact zone on the weld joint. The process of measuring the magnitude of the force exerted upon the workpiece 41 and weld joint 33 by the friction stir welding tool 14 and the contact zone of the backing ring 18 is carried out repeatedly during the friction stir welding process in order to maintain the magnitude of force exerted upon the workpiece in equilibrium to prevent deformation of the workpiece. Advantageously, the linear surface area defined by the contact zone 36 constrains the plasticized material within the weld joint 33.

The workpiece 41 preferably is moved or fed relative to the friction stir welding tool 14 and the backing device 16 such that the welding tool moves through the workpiece. As the workpiece 41 is fed to the welding tool 14, the backing ring 18 will rotate between the retaining roller(s) 28 and bogies 24, so that the contact zone 36 will remain opposite the welding tool to support the weld joint and constrain the plasticized material. More specifically, referring to FIG. 5A, the backing ring 18 will rotate within the recess 44b defined by the wheel 44 of the corresponding bogies 24. As discussed above, the bogies 24 may be moved relative to the backing ring 18 in order to stretch and flex the backing ring into the desired configuration, depending on the shape of the workpiece 41.

In an alternate embodiment (not shown) associated with a stationary workpiece 41, the backing device 16 can also include means for rotating the backing ring 18 to thereby maintain the contact zone 36 of the backing ring opposite the friction stir welding tool 14, which will be moved through the workpiece by the milling machine during formation of the weld joint 33. According to one embodiment, the rotating means includes a drive assembly and a motor in operable communication with the drive assembly. For example, the drive assembly can include a belt drive or a gear drive. As the backing ring 18 is rotated, the portion of the backing ring retained between the retaining roller(s) 28 and the plurality of bogies 24 is free to slide between the retaining roller and bogies. Advantageously, the force exerted by the restraining member 22 on the backing ring 18 is maintained while the backing ring rotates such that the contact zone 36 remains in contact with the workpiece 41 and weld joint 33. The backing device 16 can include a computing means, such as a computer or controller operating under software control, that is in electrical communication with the rotating means for rotating the backing ring 18. The computing means for controlling the rotation of the backing ring 18 can be the same as the computing means 56 for controlling movement of the restraining member 22 and/or the computing means for controlling movement of the individual bogies 24.

Although several examples of sensors and moving means have been provided, it should be appreciated that other combinations of sensors and moving means can be utilized while falling within the scope of the present invention.

Referring to FIGS. 10A–10E, a range of thickness h for the backing ring 18 can be calculated, as illustrated below. In the first case (FIGS. 10A–10C), the backing ring 18, which will be supported by ten bogies 24, will support a welding force of 8,000 lbf. A topside deflection $D_v$ of 0.05 inches is assumed to be necessary under the welding tool.

$$D_v = \frac{WR^4}{EI}\left[1 - C - \frac{2}{\pi}(\theta + S) + \frac{S}{2}(\pi - \theta)K_1 - \alpha(1 + C)\right]$$

Where:

W=8,000 lbf, welding load

ω=welding load reacted over 90°

$$\text{Load length} = 2\pi R \frac{90°}{360°}$$
$$= 2\pi(18)\frac{1}{4} = 28.3 \text{ inches}$$
$$\omega = \frac{8000}{28.3} = 283 \text{ lbf/in}$$

Figure 10A:
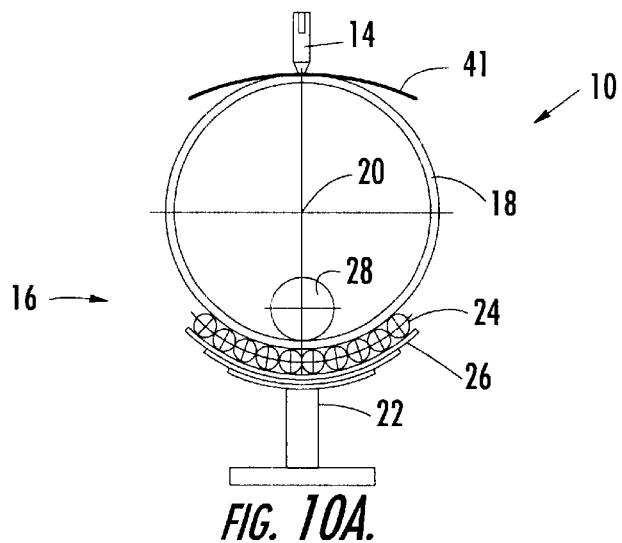
FIG. 10A is a partial elevation of a friction stir welding device, according to one embodiment of the present invention, illustrating the positioning of the backing device and friction stir welding tool for purposes of calculating the thickness of the backing ring.
Figure 10B:
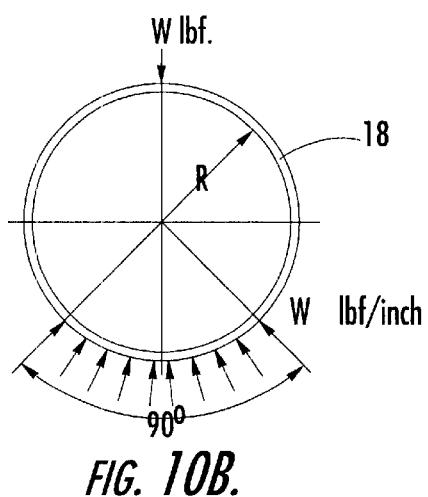
FIG. 10B is a partial elevation of the backing ring of FIG. 10A illustrating the welding force and reactionary force from the bogies.
Figure 10C:
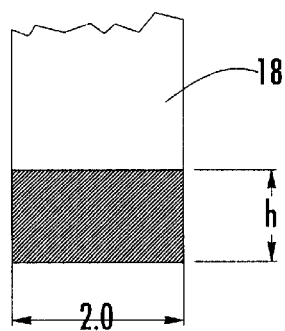
FIG. 10C is a partial cross-sectional view of the backing ring of FIG. 10A.
Figure 10D:
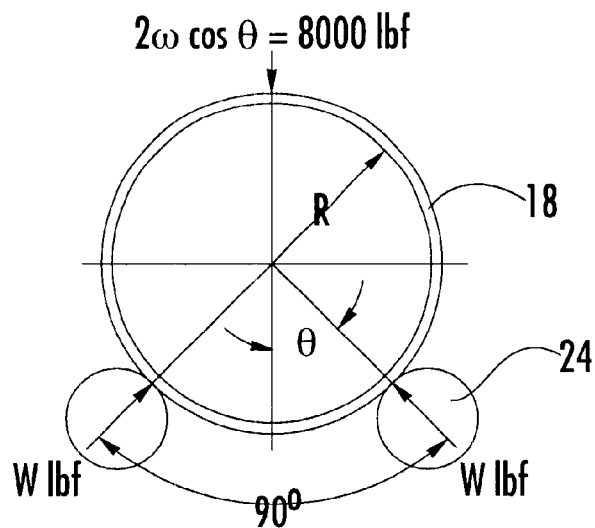
FIGS. 10D–10E are partial elevations of a backing device, according to two embodiments of the present invention, illustrating the positioning of the bogies relative to the backing ring for purposes of calculating the thickness of the backing ring.

C=cos θ=0
S=sin θ=1.0
R=18 inches
$K_1$=1
α=0
E=30×10⁶ psi, Young's modulus for steel.

$$I = \frac{bh^3}{12} = \frac{2(h^3)}{12},$$

moment of inertia where b and h are defined in FIG. 10C.

$$D_v = 0.05 \text{ (inches)} = \frac{WR^4}{EI}\left[1 - C - \frac{2}{\pi}(\theta + S) + \frac{S}{2}(\pi - \theta)K_{1-\alpha}(1 + C)\right]$$

$$= \frac{283(18)^4}{(30 \times 10^6)\left(\frac{h^3}{6}\right)}\left[1 - 0 - \frac{2}{\pi}\left(\frac{\pi}{2} + 1\right) + \frac{1}{2}(\pi - \frac{\pi}{2})1 - 0\right]$$

$$= \frac{5.94}{h^3}\left[1 - \frac{2\pi}{2\pi} - \frac{2}{\pi} + \frac{\pi}{2} - \frac{\pi}{4}\right]$$

$$= \frac{5.94}{h^3}\left[-\frac{2}{\pi} + \pi\left(\frac{1}{2} - \frac{1}{4}\right)\right]$$

$$= \frac{5.94}{h^3}\left[-\frac{2}{\pi} + \frac{\pi}{4}\right]$$

$$= \frac{5.94}{h_3}[0.1488]$$

$$h^3 = \frac{5.94}{0.05}[0.1488]$$

$$h = \sqrt[3]{17.677} = 2.60 \text{ inches (ring thickness } h)$$

In the second case (FIGS. 10C–10D), the backing ring 18 will be supported on two bogies 24 separated by 90° and will support a welding force of 8,000 lbf. As before, a topside deflection $D_v$ of 0.05 inches is assumed to be necessary under the welding tool.

$$D_v = 0.05 \text{ (inches)} = \frac{WR^3}{EI}\left[\frac{2}{\pi}(1 + C) - \frac{S}{2}(2 - K_2) - \frac{\pi - \theta}{2}CK_1\right]$$

$$\text{Where: } \theta = 45° = \frac{\pi}{8}$$

C=cos θ=0.71
S=sin θ=0.71
R=18 inches
$K_1$=$K_2$=1

$D_v = 0.05$ (inches)

$$= \frac{8000(18)^3}{(30 \times 10^6)\left(\frac{h^2}{6}\right)}\left[\frac{2}{\pi}(1 + .71) - \frac{.71}{2}(2 - 1) - \frac{\pi - \frac{\pi}{8}}{2}(.71)(1)\right]$$

$$= \frac{9.33}{h^3}\left[\frac{3.42}{\pi} - .36 - .44\pi(.71)\right]$$

$$= \frac{9.33}{h^3}[1.09 - .36 - .98]$$

$$0.05 = \frac{2.33}{h^3}$$

$$h_3 = \frac{2.33}{.05} = 46.65$$

h=⅓√46.65=3.60 inches (ring thickness h)

Thus, the above calculations illustrate that, as the number of bogies 24 used to support the backing ring 18 decreases, i.e., the fewer points of support, the thickness, and hence stiffness, of the backing ring should increase. Similar calculations can be performed for other bogie 24 and backing ring 18 configurations and dimensions taking into account the anticipated welding force.

Figure 10E:
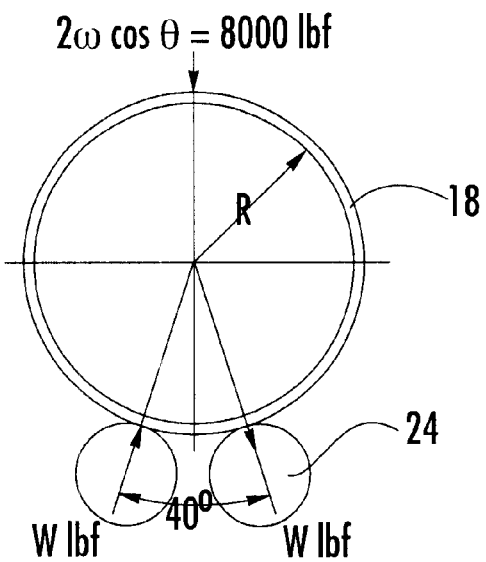

Referring to FIG. 10E, comparing the calculations above for the second case with the following calculations illustrates that the placement of the bogies 24 over a range of θ=45° to 20° is not significant with respect to ring thickness h.

$$D_v = 0.05 \text{ inches} = \frac{WR^3}{EI}\left[\frac{2}{\pi}(1 + C) - \frac{S}{2}(2 - K_2) - \frac{\pi - \theta}{2}CK_1\right]$$

Where:
- θ=20°=π/9
- C=cos θ=0.94
- S=sin θ=0.34
- R=18 inches
- $K_1=K_2=1$
- $D_v=0.05$ $$\text{(inches)} = \frac{8000(18)^3}{(30\times10^6)\frac{h^3}{6}}\left[\frac{2}{\pi}(1+0.94) - \frac{0.34}{2}(2-1) - \frac{\pi - \frac{\pi}{9}}{2}(0.94)(1)\right]$$

$$= \frac{9.33}{h^3}[1.24 - 0.17 - 1.31]$$

$$0.05 = \frac{2.262}{h^3}$$

$$h^3 = \frac{2.262}{.05}$$

h=⅓√45.24 h=3.56 inches (ring thickness h)

A backing ring 18 of one thickness will cover a range of part curvatures. However, given that the flexibility of the backing ring 18 is finite, the present invention can include a family of similar backing rings, for example, each having the same diameter, but a different thickness h, to cover a full range of workpiece 41 curvatures. These individual backing rings 18 could then be substituted into and out of the backing device 16 depending upon the curvature of the workpiece, as is commonly done with other tooling. In another embodiment (not shown), a series of nesting concentric thin rings can be added to, or removed from, the backing ring 18 to incrementally increase or decrease the thickness and, thus, stiffness and flexibility, of the backing ring. In a further embodiment (not shown), the thickness of the backing ring 18 could be varied so that the stiffness and flexibility of the backing ring matched that of a particular workpiece 41. This later embodiment would be particularly advantageous for a workpiece 41 having a variable material thickness.

The backing device 16 can also include at least one jet 38 for injecting coolant fluid into the opening 30 defined by the backing ring 18 to convectively transfer heat from the weld joint. The composition of the liquid coolant may vary so long as the liquid coolant is chemically non-reactive with the material forming the structural members 41 to avoid contaminating the weld joint. For example, depending on the composition of the structural materials 41, the liquid coolant can be an aqueous or organic solution, such as water, oil or ethylene, or propylene glycol.

Figure 11:
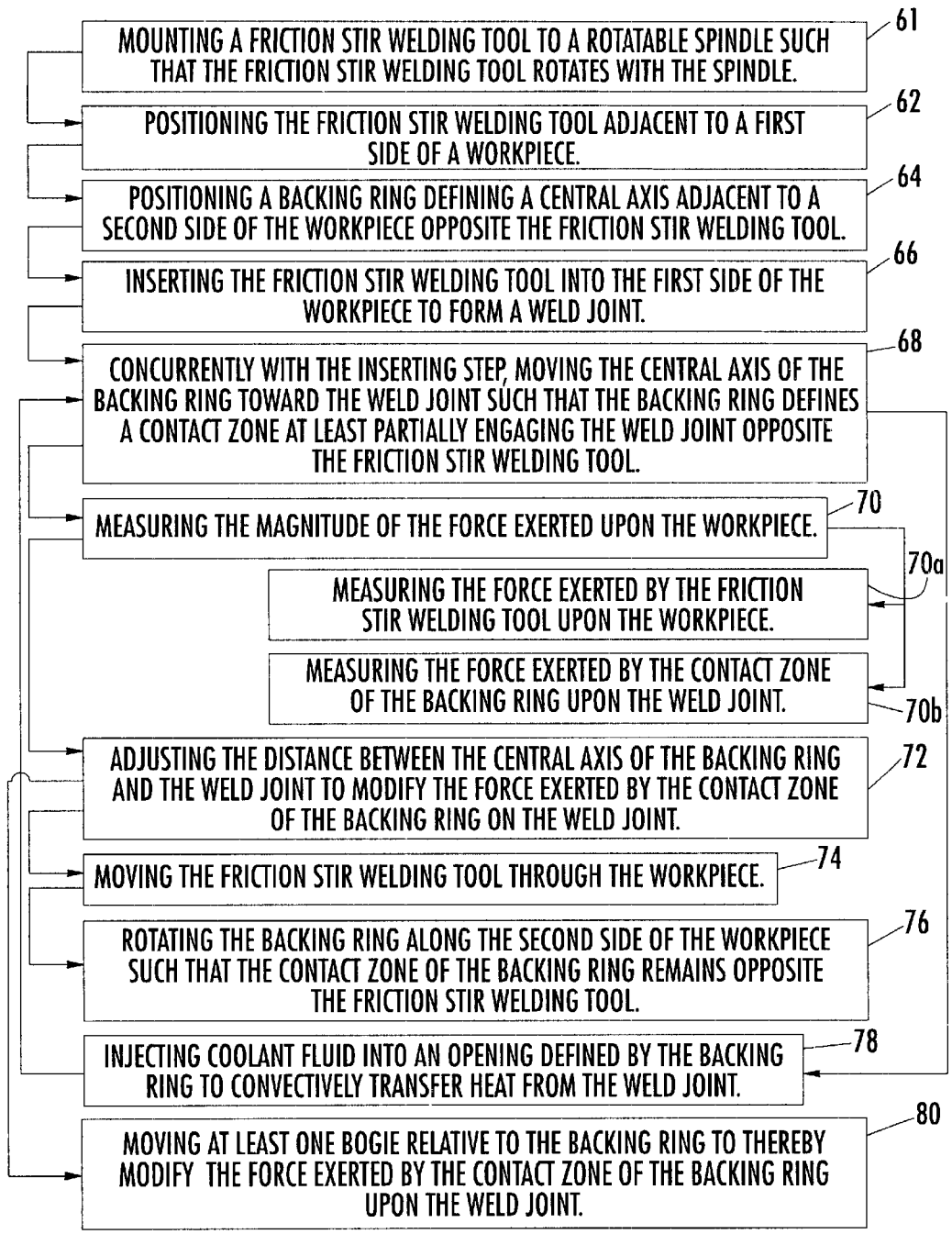
FIG. 11 is a flow chart illustrating the steps for friction stir welding, according to one embodiment of the present invention.

Referring to FIG. 11, the present invention also provides a method of friction stir welding a workpiece, comprising the steps of mounting a friction stir welding tool to a rotatable spindle such that the friction stir welding tool rotates with the spindle. See block 61. The friction stir welding probe is then positioned adjacent to a first side of a workpiece. See block 62. A backing ring defining a central axis is positioned adjacent to a second side of the workpiece opposite the friction stir welding tool. See block 64. The friction stir welding tool is then inserted into the first side of the workpiece to form a weld joint. See block 66. Concurrently with the inserting step, the central axis of the backing ring is moved toward the weld joint such that the backing ring defines a contact zone at least partially engaging the weld joint opposite the friction stir welding tool. See block 68. According to one preferred embodiment, coolant fluid is injected into an opening defined by the backing ring to convectively transfer heat from the weld joint. See block 78.

The magnitude of the force exerted upon the workpiece is then measured. See block 70. According to one embodiment, the measuring step includes measuring the force exerted by the friction stir welding tool upon the workpiece and measuring the force exerted by the contact zone of the backing ring upon the weld joint. See blocks 70a,b.

The distance between the central axis of the backing ring and the weld joint is then adjusted to modify the force exerted by the contact zone of the backing ring on the weld joint. See block 72. The friction stir welding tool is then moved through the workpiece. See block 74. The backing ring is rotated along the second side of the workpiece such that the contact zone of the backing ring remains opposite to the friction stir welding tool. See block 76. The backing ring can be rotated with the workpiece as a follower or can be automatically rotated to thereby feed the workpiece to the friction stir welding tool. The measuring and adjusting steps are repeated throughout the friction stir welding process. In one embodiment, at least one bogie is moved relative to the backing ring to thereby modify the force exerted by the contact zone of the backing ring upon the weld joint. See block 80.

Accordingly, there has been provided an apparatus and associated method allowing for the formation of uniform weld joints in workpieces having curvilinear geometries. In particular, the backing device is capable of effectively supporting a weld joint to thereby maintain the manufacturing tolerances of the workpiece, as well as to constrain the plasticized material within the weld joint. Additionally, the backing ring of the backing device is sufficiently flexible so that it can easily adapt to varying workpiece geometries.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for backing up a weld joint formed in a workpiece by a friction stir welding tool comprising:
   a backing ring, at least a portion of said backing ring engaging the weld joint opposite the friction stir welding tool such that said backing ring deforms to thereby define a contact zone that exerts a force against the weld joint, said force having a magnitude;
   a restraining member in operable communication with said backing ring;
   at least one sensor for measuring the magnitude of force exerted by said contact zone of said backing ring upon the weld joint; and
   means for moving said restraining member relative to the weld joint in order to modify the force exerted by said contact zone of said backing ring upon the weld joint, said moving means being responsive to said sensor and being in operable communication with said restraining member.

2. An apparatus according to claim 1 further comprising:
   a plurality of bogies rotatively engaging at least a portion of said backing ring and urging said contact zone of said backing ring toward the weld joint; and
   at least one spring member structured to at least partially receive said plurality of bogies, said at least one spring member being in operable communication with said retaining member for urging said bogies toward said backing ring.

3. An apparatus according to claim 2 wherein said backing ring defines an opening therethrough, and wherein the apparatus further comprises a retaining roller extending at least partially through said opening in said backing ring opposite said plurality of bogies, said retaining roller rotatively engaging at least a portion of said backing ring such that said portion of said backing ring is slidably retained between said plurality of bogies and said retaining roller.

4. An apparatus according to claim 2 further comprising means for moving said plurality of bogies relative to backing ring in order to modify the force exerted by said contact zone of said backing ring upon the weld joint, said moving means being responsive to said sensor and being in operable communication with plurality of bogies.

5. An apparatus according to claim 1 wherein said backing ring comprises a plurality of concentric rings.

6. An apparatus according to claim 1 wherein said backing ring has a variable thickness.

7. An apparatus according to claim 1 further comprising a computing means in electrical communication with said at least one sensor, and wherein said at least one sensor is selected from a group consisting of a strain-gage load cell, a piezoelectric load cell, a dynamometer, a pneumatic load cell, and a hydraulic load cell.

8. An apparatus according to claim 1 wherein said moving means comprises a drive assembly and a motor in operable communication with said drive assembly, and wherein said drive assembly is selected from a group consisting of a belt drive and a gear drive.

9. An apparatus according to claim 1 wherein said moving means comprises an actuator assembly selected from the group consisting of at least one pneumatic actuator arm and at least one hydraulic actuator arm.

10. An apparatus according to claim 1 wherein said moving means comprises at least one power screw.

11. An apparatus according to claim 1 wherein said backing ring defines an opening therethrough, and wherein the apparatus further comprises at least one jet for injecting coolant fluid into said opening in said backing ring to convectively transfer heat from the weld joint.

12. An apparatus according to claim 1 further comprising means for rotating said backing ring to thereby maintain said contact zone of said backing ring opposite the friction stir welding tool during formation of the weld joint.

13. An apparatus according to claim 12 wherein said rotating means comprises a drive assembly and a motor in operable communication with said drive assembly, and wherein said drive assembly is selected from a group consisting of a belt drive and a gear drive.

14. An apparatus for friction stir welding a weld joint in a workpiece, comprising:
   a milling machine having a rotatable spindle;
   a friction stir welding tool in rotatable communication with said spindle and in frictional engagement with the workpiece to thereby form the weld joint;
   a backing ring having a central axis, at least a portion of said backing ring engaging the weld joint opposite said friction stir welding tool such that said backing ring deforms to thereby define a contact zone that exerts a force against the weld joint, said force having a magnitude;
   at least one sensor for measuring the magnitude of force exerted upon the workpiece; and
   means, responsive to said at least one sensor and in operable communication with said backing ring, for moving said central axis of said backing ring relative to the weld joint in order to modify the force exerted by said contact zone of said backing ring upon the weld joint.

15. An apparatus according to claim 14 further comprising:
   a plurality of bogies rotatively engaging at least a portion of said backing ring and urging said contact zone of said backing ring toward the weld joint; and
   at least one spring member structured to at least partially receive said plurality of bogies, said at least one spring member being in operable communication with said retaining member for urging said bogies toward said backing ring.

16. An apparatus according to claim 15 further comprising means for moving said plurality of bogies relative to backing ring in order to modify the force exerted by said contact zone of said backing ring upon the weld joint, said moving means being responsive to said sensor and being in operable communication with plurality of bogies.

17. An apparatus according to claim 15 wherein said backing ring defines an opening therethrough, and wherein the apparatus further comprises a retaining roller extending at least partially through said opening in said backing ring opposite said plurality of bogies, said retaining roller rotatively engaging at least a portion of said backing ring such that said portion of said backing ring is slidably retained between said plurality of bogies and said retaining roller.

18. An apparatus according to claim 14 wherein said backing ring composes a plurality of concentric rings.

19. An apparatus according to claim 14 wherein said backing ring has a variable thickness.

20. An apparatus according to claim 14 further comprising a computing means in electrical communication with said at least one sensor, and wherein said at least one sensor is selected from a group consisting of a strain-gage load cell, a piezoelectric load cell, a dynamometer, a pneumatic load cell, and a hydraulic load cell.

21. An apparatus according to claim 14 wherein said moving means comprises a drive assembly and a motor in operable communication with said drive assembly, and wherein said drive assembly is selected from a group consisting of a belt drive and a gear drive.

22. An apparatus according to claim 14 wherein said moving means comprises an actuator assembly selected from the group consisting of at least one pneumatic actuator arm and at least one hydraulic actuator arm.

23. An apparatus according to claim 14 wherein said moving means comprises at least one power screw.

24. An apparatus according to claim 14 wherein said at least one sensor comprises:
   a first sensor for measuring the magnitude of force exerted by said contact zone of said backing ring upon the weld joint; and
   a second sensor for measuring the magnitude of force exerted by the friction stir welding tool upon the workpiece.

25. An apparatus according to claim 14 further comprising means for rotating said backing ring to thereby maintain said contact zone of said backing ring opposite the friction stir welding tool during formation of the weld joint.

26. An apparatus according to claim 25 wherein said rotating means comprises a drive assembly and a motor in operable communication with said drive assembly, and wherein said drive assembly is selected from a group consisting of a belt drive and a gear drive.

27. An apparatus according to claim 14 wherein said backing ring defines an opening therethrough, and wherein the apparatus further comprises at least one jet for injecting coolant fluid into said opening in said backing ring to convectively transfer heat from the weld joint.

28. A method of friction stir welding a workpiece, comprising:

mounting a friction stir welding tool to a rotatable spindle such that the friction stir welding tool rotates with the spindle;

positioning the friction stir welding probe adjacent to a first side of a workpiece;

positioning a backing ring defining a central axis adjacent to a second side of the workpiece opposite the friction stir welding tool;

inserting the friction stir welding tool into the first side of the workpiece to form a weld joint;

concurrently with said inserting step, moving the central axis of the backing ring toward the weld joint stitch that the backing ring at least partially engages the weld joint opposite the friction stir welding tool and whereby the backing ring deforms to thereby define a contact zone that exerts a force against the weld joint, the force having a magnitude;

measuring the magnitude of the force exerted upon the workpiece; and adjusting the distance between the central axis of the backing ring and the weld joint to thereby modify the force exerted by the contact zone of the backing ring on the weld joint.

29. A method of friction stir welding a workpiece according to claim 28, further comprising moving the friction stir welding tool through the workpiece.

30. A method of friction stir welding a workpiece according to claim 29, further comprising rotating the backing ring along the second side of the workpiece such that the contact zone of the backing ring remains opposite to the friction stir welding tool.

31. A method of friction stir welding a workpiece according to claim 28, further comprising moving the workpiece relative to the friction stir welding tool and the backing ring.

32. A method of friction stir welding a workpiece according to claim 28, wherein said measuring step comprises:

measuring the force exerted by the friction stir welding tool upon the workpiece; and measuring the force exerted by the contact zone of the backing ring upon the weld joint.

33. A method of friction stir welding a workpiece according to claim 28, further comprising injecting coolant fluid into an opening defined by the backing ring to convectively transfer heat from the weld joint.

34. A method of friction stir welding a workpiece according to claim 28, further comprising moving at least one bogie relative to the backing ring to thereby modify the force exerted by the contact zone of the backing ring upon the weld joint.

* * * * *

UNITED STATES PATENT AND TRADEMARK OFFICE
CERTIFICATE OF CORRECTION

PATENT NO.    : 6,484,924 B1
DATED         : November 26, 2002
INVENTOR(S)   : Forrest It is certified that error appears in the above-identified patent and that said Letters Patent is hereby corrected as shown below:

Column 12,
Line 47, in the formula, "$h_3$" should read -- $h^3$ --.

Column 16,
Line 29, "composes" should read -- comprises --.

Column 17,
Line 17, "stitch" should read -- such --.

Signed and Sealed this

Twenty-ninth Day of April, 2003

JAMES E. ROGAN
*Director of the United States Patent and Trademark Office*